United States Patent [19]
Evans et al.

[11] 3,988,505
[45] Oct. 26, 1976

[54] POLYMERIZATION PROCESS

[75] Inventors: Dennis Ernest Mackley Evans, Welwyn Garden City; Brian Norman Hendy, Welwyn, both of England

[73] Assignee: Imperial Chemical Industries Limited, London, England

[22] Filed: Feb. 20, 1975

[21] Appl. No.: 551,502

Related U.S. Application Data

[63] Continuation-in-part of Ser. No. 354,124, April 24, 1973, abandoned.

[30] Foreign Application Priority Data

May 5, 1972 United Kingdom............... 21085/72

[52] U.S. Cl............................... 526/59; 260/63 K; 260/67 UA; 526/61
[51] Int. Cl.²...................... C08F 2/24; C08F 14/06; C08F 14/08
[58] Field of Search............... 260/92.8 W, 93.5 W, 260/88.7 G, 89.5 AW, 63 K, 67 UA, 79.7; 526/59, 61

[56] References Cited
UNITED STATES PATENTS 3,546,154  12/1970  Hwa et al....................... 260/92.8 W
3,882,195  5/1975  Daniels et al................. 260/92.8 W

FOREIGN PATENTS OR APPLICATIONS 1,107,165  3/1968  United Kingdom........... 260/92.8 W Primary Examiner—Alan Holler
Attorney, Agent, or Firm—Cushman, Darby & Cushman

[57] ABSTRACT

A method is provided for controlling polymer particle size in emulsion polymerization in which at least one emulsifier is added to a polymerization reaction mixture containing at least one ethylenically unsaturated monomer at a rate determined by the rate at which heat is evolved by free radical catalyzed polymerization of the monomer such that the total amount of emulsifier fed to the reaction mixture up to any one time is related to the total amount of heat evolved up to that time.

5 Claims, 1 Drawing Figure

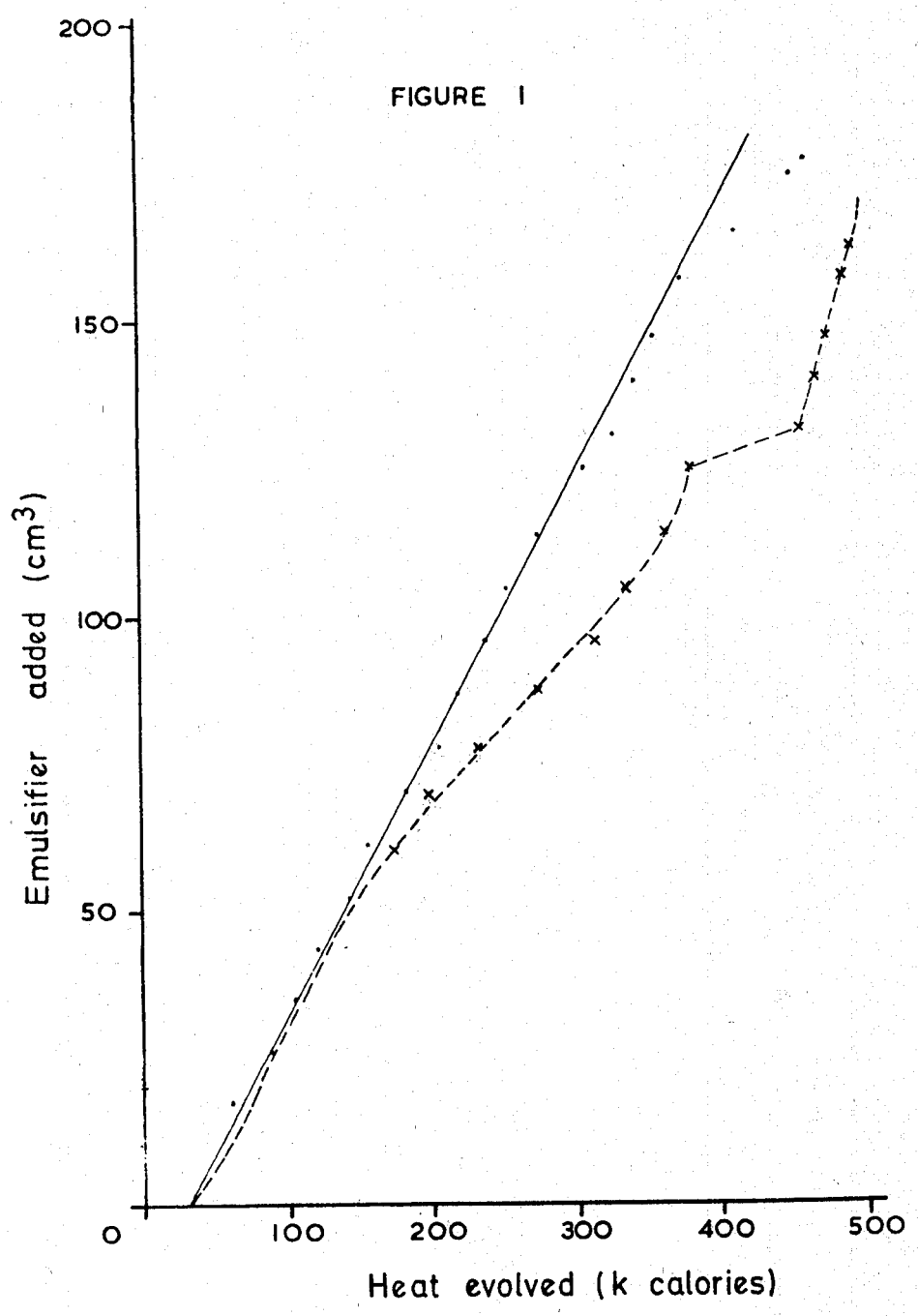

POLYMERISATION PROCESS

This application is a continuation-in-part of our United States application Ser. No. 354,124 filed Apr. 24, 1973, now abandoned.

This invention relates to polymers and in particular to a method for emulsion polymerisation.

It is often desirable that polymer particles should have a given size distribution and that the size of particles of polymer prepared in a given batch should vary only slightly from a mean value. Such particles may then give rise to polymer mixes having required physical properties such as for example paste viscosity of a polyvinyl chloride (PVC) composition. It is well known that the amount of an emulsifier present in a polymerisation mixture can lead to a control of particle size.

Excess of emulsifier can result in secondary initiation of particle formation so leading to the production of particles having very low size. If there is scarcity of emulsifier there is a risk of the mixture coagulating. It is therefore desirable not to have more emulsifier present than is required to cover the surface of particles in order to supress secondary initiation. German Pat. application No. 2,015,391 describes a method of controlling emulsifier feeding in which the total volume of the reaction mixture is monitored (dilatometry) contraction in volume of monomer being a measure of the extent of polymerisation or conversion and hence of the amount of emulsifier that has been used. We have now found that emulsifier feeding can be coupled with heat evolution from the reaction mixture.

According to the present invention a method is provided for controlling polymer particle size in emulsion polymerisation in which at least one emulsifier is added to a polymerisation reaction mixture containing at least one ethylenically unsaturated monomer at a rate determined by the rate at which heat is evolved by free radical catalysed polymerisation of the monomer such that the total amount of emulsifier fed to the reaction mixture up to any one time is related to the total amount of heat evolved up to that time. The amount of heat produced in a polymerisation reaction provides an accurate indication of the amount of polymer formed.

The method of the invention is useful for making polymers or copolymers under conditions of free-radical catalysis from any polymerisable or copolymerisable monomer such as a monomer in which the functional ethylenic bond is conjugated to an aromatic ring, as for example in styrene, α-methylstyrene, o-methylstyrene, m-methylstyrene, p-methylstyrene, 2,5-dimethylstyrene, p-methoxystyrene, p-dimethylaminostyrene, p-acetamidostyrene, m-vinylphenol, p-trimethylsilylstyrene, ar-dibromostyrene, 1-vinylnaphthalene, acenaphthylene, 3-vinylphenanthrene, 2-vinylthiophene, indene, courmarone, N-vinylcarbazole or a vinyl pyridine (e.g. 2-methyl-5-vinylpyridine); or a monomer such as vinyl acetate or other vinyl esters, butadiene, isoprene, ethylene, propene, isobutene, 4-methylpentene-1, vinyl chloride, vinylidene chloride, vinyl fluoride, vinylidene fluoride, hexafluoropropene, tetrafluoroethylene, chlorotrifluoroethylene; or an electron-deficient vinyl monomer, for example acrolein, methacrolein, acrylonitrile, methacrylonitrile, α-acetoxyacrylonitrile, acrylic acid and methacrylic acid and esters thereof, cinnamonitrile, chloroacrylonitrile, fumaronitrile, maleonitrile, maleic anhydride, maleimide and its N-substituted (particularly its N-aryl) derivatives and also alkyl vinyl and alkyl isopropenyl ketones, ethers and sulphones, e.g. vinyl methyl ether, vinyl ethyl ether and vinyl methyl sulphone.

The method is particularly useful in the polymerisation of vinyl chloride. In the method of the invention the monomer may be present in totality in the initial charge to the reaction vessel or may be fed to the reaction mixture during polymerisation as described for example in British Pat. specification No. 663,268 and 1,197,721.

The metering of the emulsifier according to the rate of evolution of heat may be conveniently effected using the techniques described in British Pat. specification No. 1,197,721. Thus any suitable calorimetric technique may be used to measure the heat produced in the polymerisation reaction. On a large scale, a cooling liquid (e.g. water) may be circulated around the reaction vessel and the heat produced in the polymerisation reaction can then be calculated from the temperature rise undergone by the liquid and its rate of flow, the latter being thermostatically controlled by the temperature of the reaction medium. For operations on a smaller scale, the heat is conveniently removed by supplying the latent heat of evaporation of a liquid brought into contact with a surface of the reaction vessel, and the amount of the vapour (or of liquid condensed therefrom) is a measure of the amount of heat produced in the polymerisation reaction.

It is particularly convenient to allow heat to be transferred from the reaction medium to a liquid whose boiling point is at or slightly below the polymerisation temperature. The transferred heat supplies the latent heat of evaporation of the liquid, and, by condensing the distillate, e.g. in a burette, and measuring its quantity, the amount of heat released in the polymerisation reaction over a given time is readily ascertained.

In practical terms, on a small scale, the level of the condensed liquid may be sensed electronically and pumped from the burette at a rate sufficient to keep the liquid level constant and at the position dictated by the electronic sensing device, the pump being activated by this sensing device. This pump is connected by a direct mechanical linkage to another similar unit which pumps emulsifier solution into the reaction vessel. The pumping capacities of the two pumping units are chosen such that the required amount of emulsifier is added to the reaction vessel for a given amount of liquid pumped out of the burette. adjustments to the measured heat to allow for changes in the temperature of the reactants may be made by alteration of this fixed level.

On a larger scale, using a reactor with cooling water circulating in a coil, the heat output of the reaction can be determined by the rise in temperature and flow rate of the circulating water. The heat liberated and the amount of emulsifier to be added to the reaction may be computed from the flow rate and temperature difference electronically and the pump feeding this emulsifier actuated automatically.

Suitable emulsifiers for the method of the invention include alkali sulphates of long chain fatty alcohols, the alkali salts of alkyl or alkaryl sulphonates such as for example dodecyl benzene sulphonate, and soaps of fatty acids. Typically the emulsifiers are added as a solution, conveniently in water although this will depend on the liquor used in the emulsion polymerisation.

The polymerisation reaction may be carried out at any temperature, the range 0° C to 100° C being usual and 50° C to 80° C being convenient.

The method of the invention is particularly useful in the preparation of latices in which the particles are intended as seed particles which are sites for further or secondary polymerisation. The method may also be used in the secondary polymerisation so as to produce new seed particles as well as concurrent polymerisation onto existing seed particles. Such seeding and polymerisation thereon is well known in the art of emulsion polymerisation, particularly in the production of PVC paste polymers.

The invention is illustrated by the following example.

An autoclave similar to that described in Example 6 of British specification No. 1,197,721 but having 5 dm³ capacity was charged with distilled water (1300 g) and partially freed from air by evacuating the vessel to a pressure of about 50 torr. Vinyl chloride (1500 g; 24 moles) and ammonia solution [2.5 g of concentrated aqueous ammonia (density 0.880) in 10 cm³ of water] were added, thoroughly stirred and heated to 50° C. When the contents had reached a steady temperature of 50° C, ammonium persulphate (1 g) was added as catalyst and the polymerisation reaction started. The course of the reaction was followed continuously by measuring the heat evolved by the reaction and is indicated in the following table. After the reaction had proceeded to about 7% conversion of monomer to polymer so as to form seed particles, emulsifier solution (sodium lauryl sulphate, 12 g as 5% by weight aqueous solution) was added continuously as determined by the evolution of heat also as indicated in the following table. After 5 hours and after the evolution of 464 k calories, the polymerisation reaction was terminated. If all the vinyl chloride had been polymerised, the heat output would have totalled 540 k calories. The latex so formed consisted of particles having diameter 0.35 ± 0.01 μm and on microscopic examination particles of smaller diameter were not observed.

| Heat Evolved (k calories) | Emulsifier added (cm⁻³) |
| --- | --- |
| 31.7 | 0 |
| 59.5 | 17.5 |
| 89.5 | 26.2 |
| 107 | 35.0 |
| 121 | 43.8 |
| 141 | 52.5 |
| 155 | 61.3 |
| 184 | 70.0 |
| 207 | 78.8 |
| 221 | 87.5 |
| 238 | 96.2 |
| 253 | 105 |
| 273 | 114 |
| 308 | 122.5 |
| 328 | 131 |
| 341 | 140 |
| 355 | 148 |
| 375 | 157.5 |
| 411 | 166 |
| 452 | 175 |
| 462 | 177 |

The data from the above table is presented in accompanying FIG. 1 (continuous line) which indicates that emulsifier was added in relation to the heat evolution from the reaction.

In a comparative example, emulsifier solution was added as indicated in the following table.

| Heat Evolved (k calories) | Emulsifier added (cm⁻³) |
| --- | --- |
| 31.7 | 0 |
| 59.5 | 17.5 |
| 89.5 | 26.2 |
| 107 | 35.0 |
| 121 | 43.8 |
| 141 | 52.5 |
| 174 | 61.3 |
| 199 | 70.0 |
| 235 | 78.8 |
| 277 | 87.5 |
| 315 | 96.2 |
| 336 | 105 |
| 353 | 114 |
| 380 | 122.5 |
| 457 | 131 |
| 468 | 140 |
| 474 | 148 |
| 488 | 157.5 |
| 494 | 162 |

The latex contained some particles having diameter 0.35 ± 0.01 μm but microscopic examination showed the presence of many particles having lower diameter which made the latex unacceptable as a monodisperse latex. The data from the above table is presented accompanying FIG. 1 (dashed line) which indicates that emulsifier was not added in relation to heat evolution from the reaction.

We claim:

1. A method for controlling polymer particle size in a free radical catalyzed emulsion polymerization of at least one ethylenically unsaturated monomer in which at least one emulsifer is added to the polymerization as the polymerization proceeds, said method including the step of continuously measuring the heat evolved in the polymerization reaction so as to follow the conversion of monomer to polymer and adding said emulsifier to the polymerization at a rate determined by the measured rate at which heat is evolved such that the total amount of emulsifier fed to the reaction mixture up to any one time is related to the total amount of heat evolved up to that time, said ethylenically unsaturated monomer being selected from the group consisting of styrene, α-methylstyrene, o-methylstyrene, m-methylstyrene, p-methylstyrene, 2,5-dimethylstyrene, p-methoxystyrene, p-dimethylaminostyrene, p-acetamidostyrene, m-vinylphenol, p-trimethylsilystyrene, ar-debromostyrene, 1-vinylnaphthalene, acenaphthylene, 3-vinylphenanthrene, 2-vinylthiophene, indene, courmarone, N-vinylcarbazole, vinyl pyridine, vinyl acetate, butadiene, isoprene, ethylene, propylene, isobutene, 4-methylpentene-1, vinyl chloride, vinylidene chloride, vinyl fluoride, vinylidene fluoride, hexafluoropropene, chlorotrifluoro-ethylene, acrolein, methacrolein, acrylonitrile, methacrylonitrile, α-acetoxyacrylonitrile, acrylic acid, methacrylic acid, and esters of said acids, cinnamonitrile, chloroacrylonitrile fumaronitrile, maleonitrile, maleic anhydride, moleimide, N-arylomadeimides, alkylvinyl and alkylisopropenyl ketones, ethers and sulfones.

2. A method according to claim 1 in which the polymerisation is a homopolymerisation.

3. A method according to claim 1 in which the total quantity of monomer is present in the initial charge.

4. A method according to claim 1 on which the ethylenically unsaturated monomer is vinyl chloride.

5. A process as set forth in claim 1 wherein said ethylenically unsaturated monomer is vinylidene chloride.

* * * * *